(12) United States Patent
Theiss

(10) Patent No.: US 11,027,845 B2
(45) Date of Patent: Jun. 8, 2021

(54) DEVICE AND METHOD TO INTERCEPT AN AERIAL VEHICLE

(71) Applicant: Shawn M. Theiss, North Benton, OH (US)

(72) Inventor: Shawn M. Theiss, North Benton, OH (US)

( * ) Notice: Subject to any disclaimer, the term of this patent is extended or adjusted under 35 U.S.C. 154(b) by 418 days.

(21) Appl. No.: 16/148,906

(22) Filed: Oct. 1, 2018

(65) Prior Publication Data

US 2019/0100315 A1 Apr. 4, 2019

Related U.S. Application Data

(60) Provisional application No. 62/566,131, filed on Sep. 29, 2017.

(51) Int. Cl.
*B64D 7/00* (2006.01)
*F41H 11/02* (2006.01)
*B64D 17/78* (2006.01)

(52) U.S. Cl.
CPC ............... *B64D 7/00* (2013.01); *B64D 17/78* (2013.01); *F41H 11/02* (2013.01)

(58) Field of Classification Search
CPC ............ B64D 7/00; B64D 17/78; F41H 11/02
See application file for complete search history.

(56) References Cited

U.S. PATENT DOCUMENTS

| 1,309,530 A | 7/1919 | Lamberson |
| 3,349,514 A | 10/1967 | Trechot |
| 3,803,463 A | 4/1974 | Cover |
| 4,253,132 A | 2/1981 | Cover |
| 4,656,945 A | 4/1987 | Stancil |
| 4,912,869 A | 4/1990 | Govett |

(Continued)

FOREIGN PATENT DOCUMENTS

| CN | 102384702 | 3/2012 |
| CN | 107976118 A | 5/2018 |

(Continued)

OTHER PUBLICATIONS

Michigan Tech News, Marcia Goodrich, "Drone Catcher: 'Robotic Falcon' can Capture, Retrieve Renegade Drones" pp. 1-2, Jan. 7, 2016, https://www.mtu.edu/news/stories/2016/january/drone-catcher-robotic-falcon-can-capture-retrieve-renegade-drones.html.

(Continued)

*Primary Examiner* — Justin M Benedik
(74) *Attorney, Agent, or Firm* — Zollinger & Burleson Ltd.

(57) ABSTRACT

An airframe is provided that can be flown under the control of an operator or an automated sensor and feedback system. The airframe can be any of a variety of known configurations with multiple rotors, fixed or retractable wings, puller or pusher propellers, or jet engines. The airframe includes at least one arm that is used to intercept and disable another airborne vehicle. In some configurations, the arm is fixed and can include fingers at its outer end. In other configurations, the arm is movable from a closed condition to an open condition. A wire or net is connected between the arm and a portion of the airframe so that the wire or net is spread open when the arm is deployed to the open condition. The wire or net are configured to disable or capture a target such as another aerial vehicle.

17 Claims, 7 Drawing Sheets

(56) References Cited

U.S. PATENT DOCUMENTS

| | | | |
|---|---|---|---|
| 5,583,311 A | 12/1996 | Rieger | |
| 5,750,918 A | 5/1998 | Mangolds | |
| 5,898,125 A | 4/1999 | Mangolds et al. | |
| 6,854,374 B1 | 2/2005 | Breazeale | |
| 6,904,838 B1 | 6/2005 | Dindl | |
| 7,264,204 B1 | 9/2007 | Portmann | |
| 7,328,644 B2 | 2/2008 | Vickroy | |
| 7,398,617 B2 | 7/2008 | Mattox | |
| 7,866,250 B2 | 1/2011 | Farinella | |
| 8,123,176 B2 | 2/2012 | Mak | |
| 8,205,537 B1 | 6/2012 | Dupont | |
| 8,375,837 B2 | 2/2013 | Goossen et al. | |
| 8,387,540 B2 | 3/2013 | Merems | |
| 8,596,178 B2 | 12/2013 | Rogers et al. | |
| 8,662,441 B2 | 3/2014 | Powell et al. | |
| 9,074,858 B2 | 7/2015 | Yee | |
| 9,085,362 B1* | 7/2015 | Kilian | B64F 1/02 |
| 9,134,098 B1 | 9/2015 | Pruett | |
| 9,134,099 B2 | 9/2015 | Tseng | |
| 9,187,184 B2 | 11/2015 | Miralles et al. | |
| 9,221,557 B1 | 12/2015 | Friesel | |
| 9,527,603 B2 | 12/2016 | Allen et al. | |
| 9,656,765 B2 | 5/2017 | von Flotow et al. | |
| 10,005,556 B2 | 6/2018 | Rastgaar Aagaah et al. | |
| 2001/0032577 A1 | 10/2001 | Swartout | |
| 2002/0134365 A1 | 9/2002 | Gray | |
| 2005/0166441 A1 | 8/2005 | Mattox | |
| 2006/0169832 A1 | 8/2006 | Glasson | |
| 2006/0219094 A1 | 10/2006 | Padan | |
| 2007/0169616 A1 | 7/2007 | Vickroy | |
| 2007/0180983 A1 | 8/2007 | Farinella et al. | |
| 2007/0261542 A1 | 11/2007 | Chang et al. | |
| 2009/0050750 A1* | 2/2009 | Goossen | B64C 39/024 244/76 R |
| 2009/0084284 A1 | 4/2009 | Martinez | |
| 2009/0173250 A1 | 7/2009 | Marscher | |
| 2010/0237183 A1 | 9/2010 | Wilson et al. | |
| 2010/0282058 A1 | 11/2010 | Nelson et al. | |
| 2011/0005373 A1 | 1/2011 | Martinez | |
| 2011/0220087 A1 | 9/2011 | Gerwig | |
| 2012/0011996 A1 | 1/2012 | Glasson | |
| 2012/0192707 A1 | 8/2012 | Rogers et al. | |
| 2012/0210851 A1 | 8/2012 | Glasson | |
| 2012/0210904 A1 | 8/2012 | Merems | |
| 2014/0000145 A1 | 1/2014 | Merritt | |
| 2014/0216290 A1 | 8/2014 | Yee | |
| 2014/0231575 A1* | 8/2014 | Shand | F41H 13/0006 244/3.1 |
| 2014/0331984 A1 | 11/2014 | Brahler | |
| 2015/0168107 A1 | 6/2015 | Tseng | |
| 2015/0241180 A1 | 8/2015 | Pruett | |
| 2015/0316345 A1 | 11/2015 | Brahler | |
| 2015/0360797 A1 | 12/2015 | Melish et al. | |
| 2016/0023760 A1 | 1/2016 | Goodrich | |
| 2016/0161225 A1 | 6/2016 | Searle | |
| 2016/0194069 A1 | 7/2016 | Taylor | |
| 2016/0245600 A1 | 8/2016 | Merritt | |
| 2016/0251088 A1 | 9/2016 | Melish et al. | |
| 2016/0376029 A1 | 12/2016 | Sekiya | |
| 2017/0036762 A1 | 2/2017 | Gamble et al. | |
| 2017/0158340 A1 | 6/2017 | von Flotow et al. | |
| 2017/0225784 A1 | 8/2017 | Hayes et al. | |
| 2017/0355461 A1* | 12/2017 | Naito | G05D 1/12 |
| 2017/0356726 A1 | 12/2017 | Theiss et al. | |
| 2018/0105271 A1 | 4/2018 | Wypyszynski et al. | |
| 2018/0162530 A1* | 6/2018 | Klein | F41H 11/04 |
| 2018/0170510 A1 | 6/2018 | Brock | |
| 2019/0047696 A1* | 2/2019 | Gwin | B25J 9/1085 |

FOREIGN PATENT DOCUMENTS

| | | |
|---|---|---|
| CN | 108082510 A | 5/2018 |
| DE | 102015003323 A1 | 9/2016 |
| EP | 2186728 B1 | 5/2010 |
| KR | 101857135 B1 | 5/2018 |
| WO | 2014080387 A2 | 5/2014 |
| WO | 2017037698 A1 | 3/2017 |

OTHER PUBLICATIONS

BBC News, Technology, "Drone squad to be launched by Tokyo police" pp. 1-2, Dec. 11, 2015, https://www.bbc.com/news/technology-35070818.

Airspace, "Drone Security System" p. 1, accessed Aug. 29, 2018, https://airspace.co/.

Unmanned Aerial Systems—A Beginners Guide, "Drone Catcher!" pp. 1-2, Feb. 12, 2015, https://overlanduas.wordpress.com/2015/02/12/drone-catcher/.

Reuters, Technology News, Stephen Nellis, "Drone-catchers emerge on a new aerial frontier" pp. 1-6, Mar. 21, 2017, https://www.reuters.com/article/us-usa-drone-hunter-idUSKBN16S1IT.

Military & Aerospace Electronics, John Keller, "Navy demonstrates ability to launch surveillance UAVs stealthily from submerged submarines" pp. 1-3, Dec. 6, 2013, https://www.militaryaerospace.com/trusted-computing/article/16715659/navy-demonstrates-ability-to-launch-surveillance-uavs-stealthily-from-submerged-submarines.

Raytheon, "Coyote UAS" pp. 1-5, accessed Aug. 30, 2018 from https://www.raytheon.com/capabilities/products/coyote.

New Scientist, Technology, Chris Baraniuk, "The no-drone zone: How to stop UAVs spying on us from above" pp. 1-3, Apr. 28, 2015, https://www.newscientist.com/article/dn27429-the-no-drone-zone-how-to-stop-uavs-spying-on-us-from-above/.

The Telegraph, Rhiannon Williams, "Tokyo police are using drones with nets to catch other drones" pp. 1-2, Dec. 11, 2015, https://www.telegraph.co.uk/technology/2016/01/21/tokyo-police-are-using-drones-with-nets-to-catch-other-drones/.

Jan. 7, 2016 Drone Catcher: "Robotic Falcon" can Capture, Retrieve Renegade Drones.

Dec. 11, 2015 Drone squad to be launched by Tokyo police.

Drone Security System retrieved from https://airspace.co/ Aug. 29, 2018.

Drone Catcher!, Feb. 12, 2015.

Mar. 21, 2017 Reuters, technology news, Drone-catchers emerge on a new aerial frontier.

Dec. 6, 2013 Navy demonstrates ability to launch surveillance UAVs stealthily from submerged submarines.

Coyote UAS, accessed Aug. 30, 2018 from https://www.raytheon.com/capabilities/products/coyote.

Apr. 28, 2015 The no-drone zone: How to stop UAVs spying on us from above.

Jan. 21, 2016 Tokyo police are using drones with nets to catch other drones.

* cited by examiner

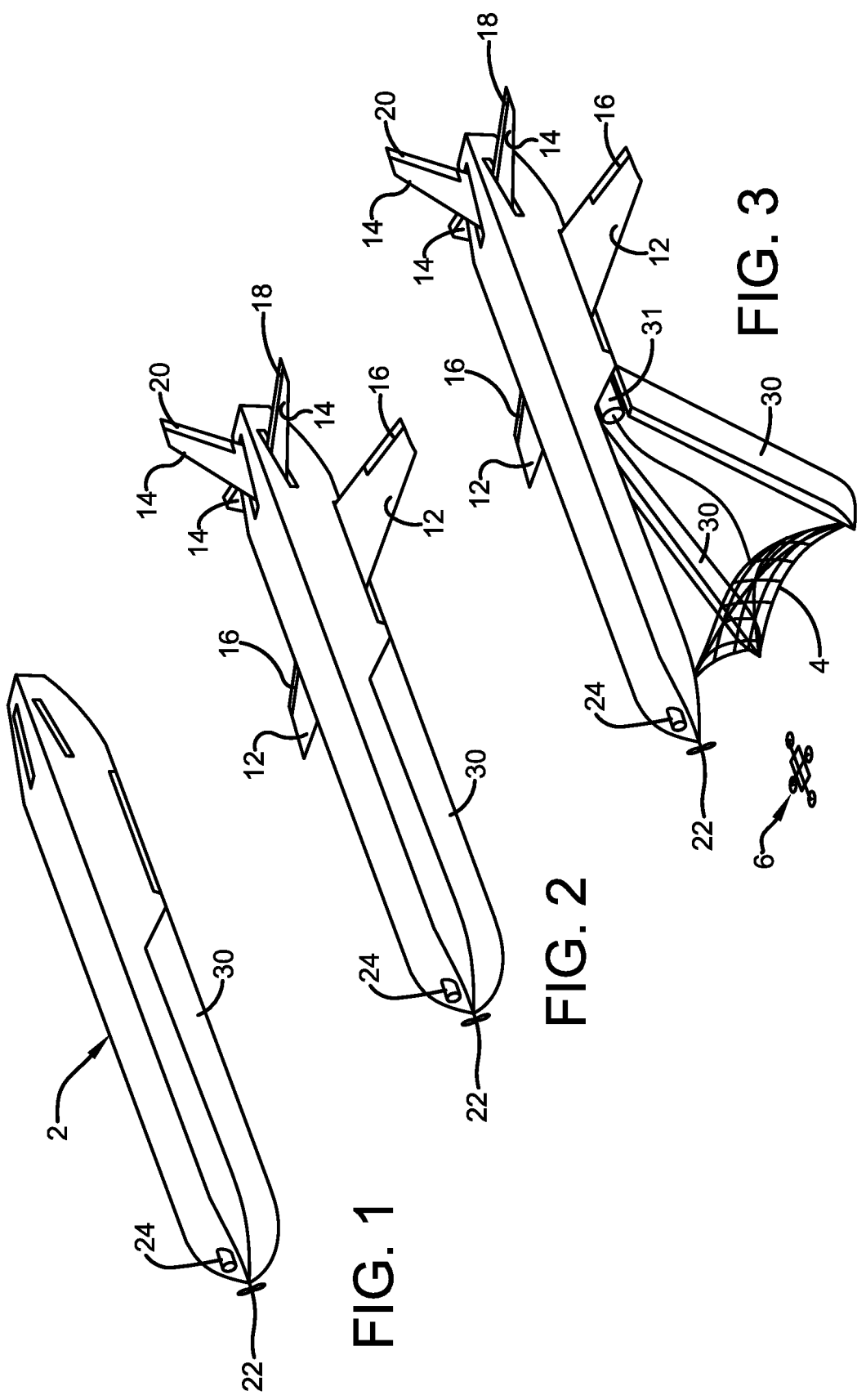

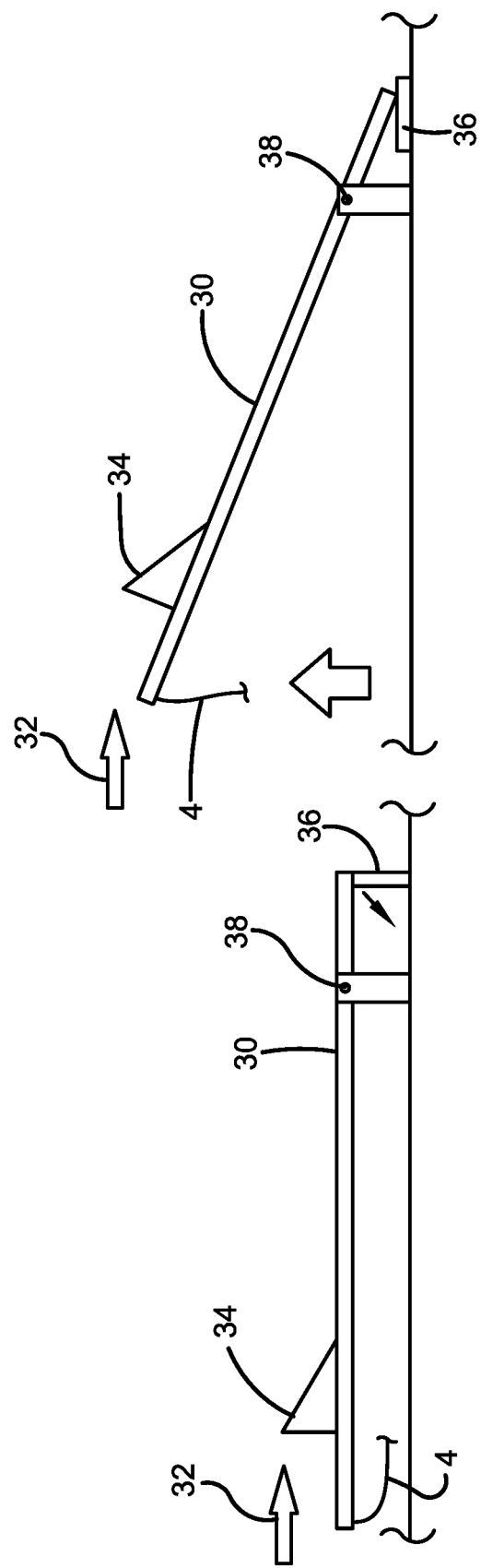

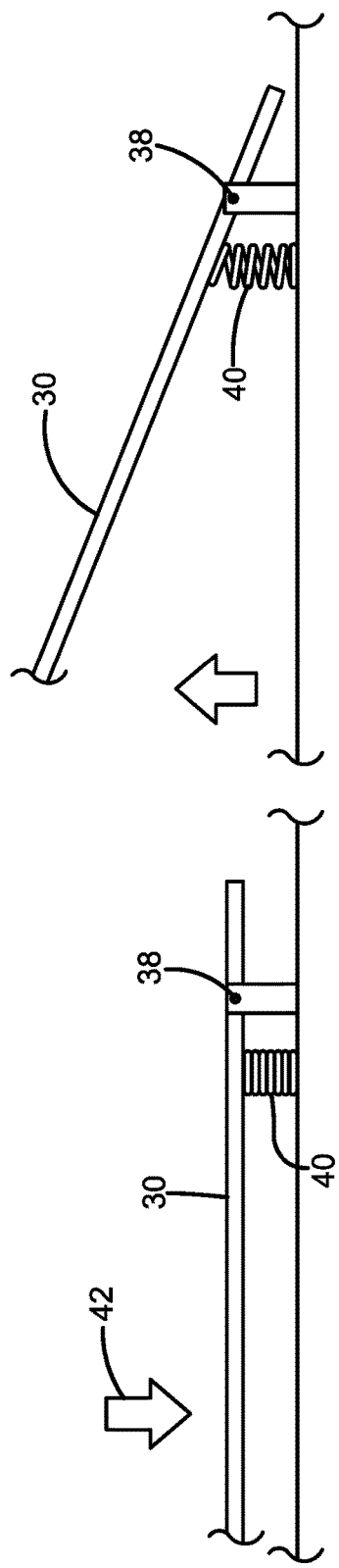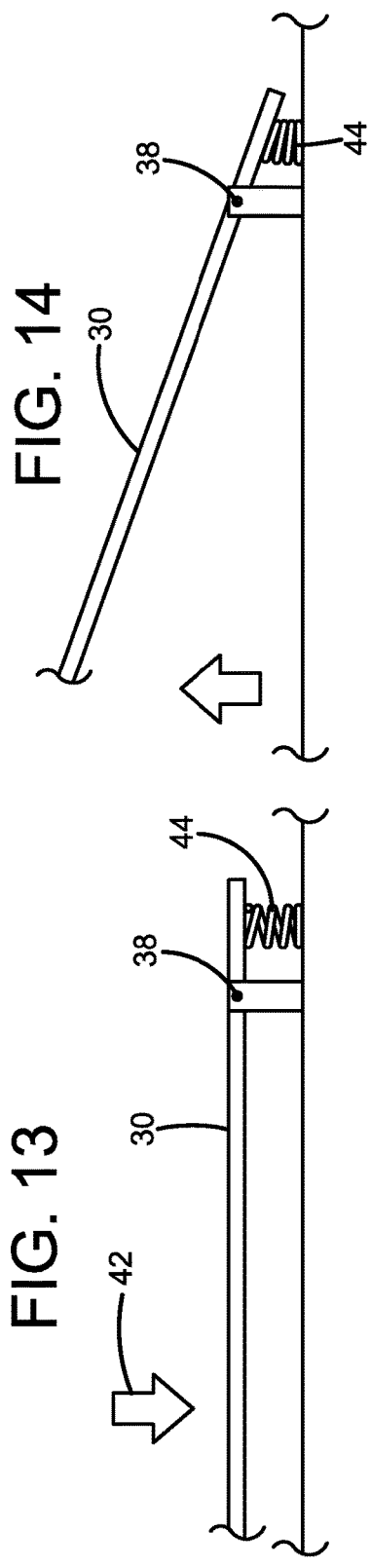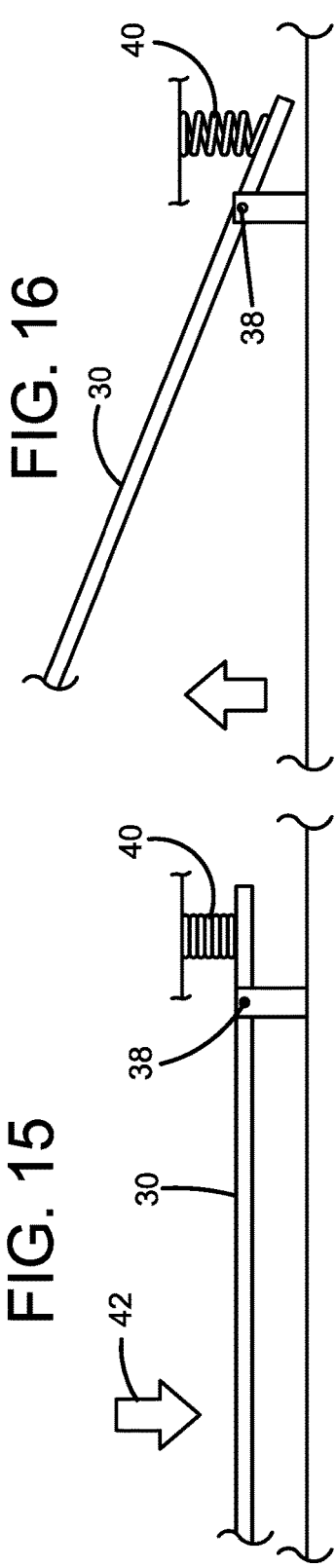

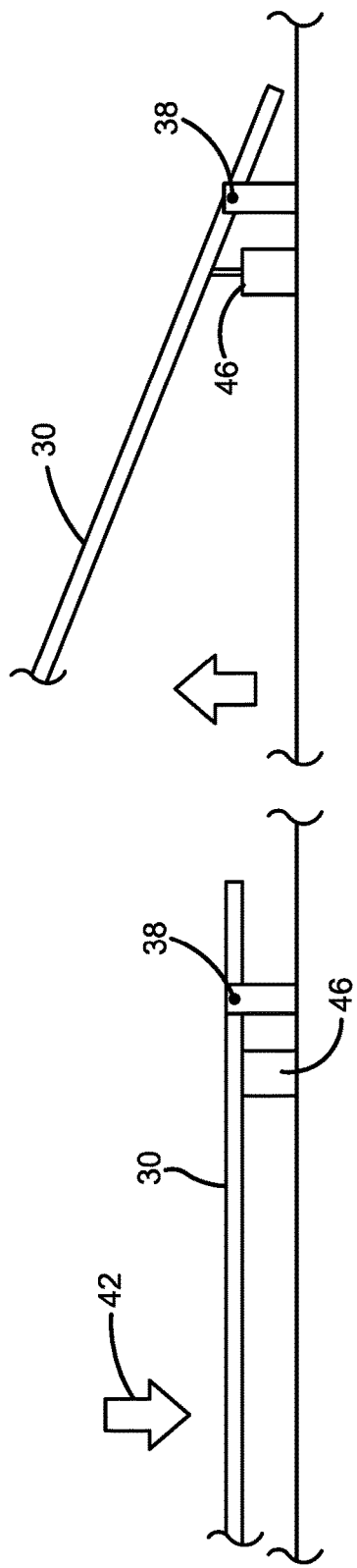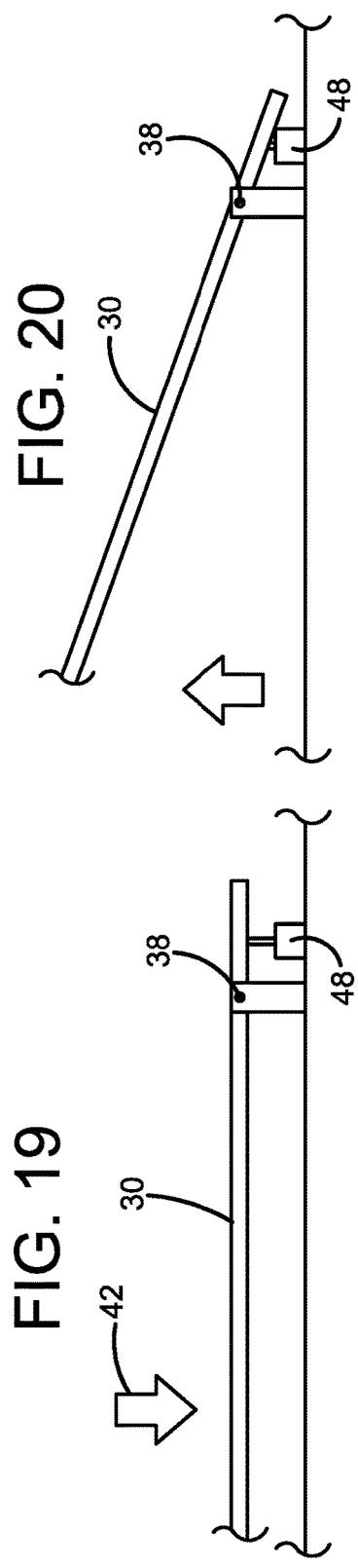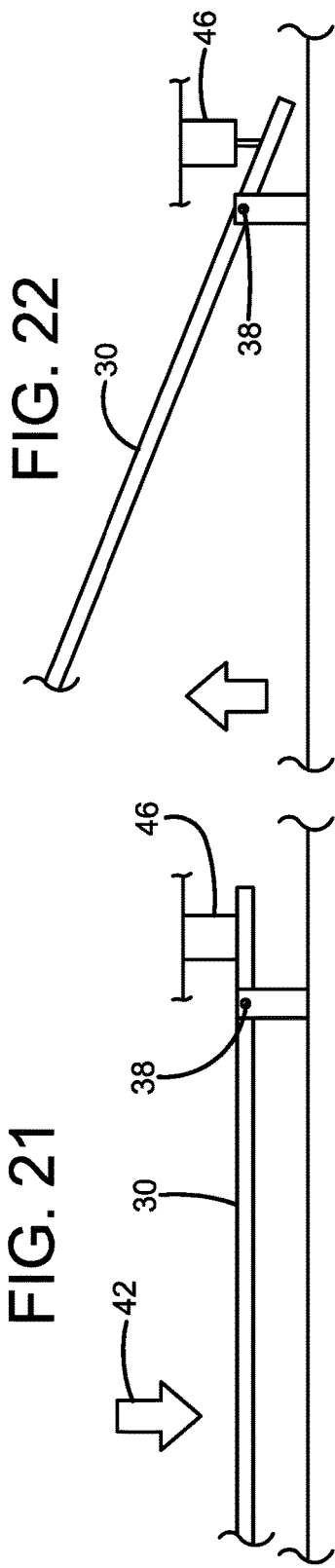

DEVICE AND METHOD TO INTERCEPT AN AERIAL VEHICLE

CROSS REFERENCE TO RELATED APPLICATIONS

This application claims the benefit of U.S. Provisional application No. 62/566,131 filed Sep. 29, 2017; the disclosures of which are incorporated herein by reference.

BACKGROUND OF THE DISCLOSURE

1. Technical Field

The disclosure relates to airborne vehicles that include a device or devices used to capture or disable another airborne vehicle. More particularly, the disclosure relates to an airframe that selectively deploys an expanded net that travels with the airframe. The expanded net is configured to capture or disable another aerial vehicle such as a drone or multirotor UAV.

2. Background Information

Privately-owned aerial vehicles have increased in numbers which especially include unmanned aerial vehicles (UAVs) which are commonly referred to as drones. These vehicles have historically been for hobbyists who enjoy flying and the challenges of building airborne vehicles and controlling them with a short range radio controller. With the dramatic rise in smartphone technology, miniaturization of cameras, and fast, ubiquitous cellular communications technologies, the use of UAVs for aerial photography or the delivery of goods has increased. Although many of these uses are beneficial to society, some have found uses for drones that do not benefit the general public. One example is the delivery of contraband over borders or inside prison walls. Another example is photography of private areas at low elevations or real-time surveillance of private leisure or commercial activities from low elevation positions that were previously unattainable by a photographer. Other UAV activities are dangerous such as when a UAV flies into the airspace used by airplanes. As the uses of UAVs increases, those persons in charge of securing the facilities or activities above desire a safe device and method for disabling a UAV.

SUMMARY OF THE DISCLOSURE

An airframe is provided that can be flown under the control of an operator or an automated sensor and feedback system. The airframe can be any of a variety of known configurations with multiple rotors, fixed or retractable wings, puller or pusher propellers, or jet engines. The airframe includes at least one arm that is used to intercept and disable another airborne vehicle. In some configurations, the arm is fixed and can include fingers at its outer end. In other configurations, the arm is movable from a closed condition to an open condition. A wire or net is connected between the arm and a portion of the airframe so that the wire or net is spread open when the arm is deployed to the open condition. The wire or net are configured to disable or capture a target such as another aerial vehicle. The operator flies the airframe into the target vehicle such that the arm or the wire/net engages and disables the target. The net is not launched from the airframe at the target aircraft. Rather, the operator deploys the arm and flies the airframe into the target aircraft causing the target aircraft to engage to open net.

In one configuration, the arm or multiple arms open laterally from the body of the airframe at a location rearwardly of the front end of the airframe and forwardly of the rear end of the airframe. In another configuration, the arm or multiple arms open at the front of the airframe. The net or wire is stored within the airframe or between the closed arms.

The disclosure provides configurations with different numbers and different arm shapes along with different locations and types of actuators for the arms.

The net or the combination of the net and arm(s) can be released from the airframe after the target vehicle has been entangled in the net. These can be dropped from the vehicle to allow the user to fly the vehicle without the encumbrance of the captured vehicle. A parachute can be used to control the descent of the dropped vehicle. Alternatively, the airframe and captured vehicle can be flown to a desired location and landed. In a further configuration, both the airframe and target vehicle can be returned to the ground through a controlled descent with a parachute.

In one configuration, an option is to have the airframe launched from a launch tube that uses a mechanical device (such as a spring) or an expanding gas (compressed air or a controlled explosion) to shoot the airframe into the air at which time the wings and tail of the airframe are opened and the propeller or jet engine of the airframe are activated. The use of the launch tube allows the airframe to be rapidly deployed in an area that does not have an open space for a runway and allows the airframe to be rapidly launched in a desired direction. In other configurations, the airframe can be launched from the ground with its own power, from the air from another vehicle, or from a moving vehicle.

The disclosure provides a method of intercepting and disabling an aerial vehicle with another aerial vehicle. The intercepting vehicle includes arms that are selectively deployed from closed conditions to open conditions to open a net in front of the arms. The aerial vehicle with the net deployed is flown into the target vehicle to disable the target vehicle. The net is held open in front of the arms so that the net leads the intercepting vehicle.

The preceding non-limiting aspects, as well as others, are more particularly described below. A more complete understanding of the methods and devices can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 1 is a perspective view of an exemplary airframe with wings and tail retracted and its net arms in their closed condition.

FIG. 2 is a view of the airframe of FIG. 1 with the wings and tail extended and its net arms in their closed condition.

FIG. 3 is a view of the airframe of FIG. 1 with two arms deployed to their open condition to open the net that is supported between the arms and the airframe.

FIG. 11 is a schematic view of a closed arm.

FIG. 12 is a schematic view of the arm of FIG. 11 in the open condition.

FIG. 13 is a schematic view of a closed arm.

FIG. 14 is a schematic view of the arm of FIG. 13 in the open condition.

FIG. 15 is a schematic view of a closed arm.

FIG. 16 is a schematic view of the arm of FIG. 15 in the open condition.

FIG. 17 is a schematic view of a closed arm.

FIG. 18 is a schematic view of the arm of FIG. 17 in the open condition.

FIG. 19 is a schematic view of a closed arm.

FIG. 20 is a schematic view of the arm of FIG. 19 in the open condition.

FIG. 21 is a schematic view of a closed arm.

FIG. 22 is a schematic view of the arm of FIG. 21 in the open condition.

FIG. 23 is a schematic view of a closed arm.

FIG. 24 is a schematic view of the arm of FIG. 23 in the open condition.

Similar numbers refer to similar elements throughout the specification.

DETAILED DESCRIPTION OF THE DISCLOSURE

Figure 4:
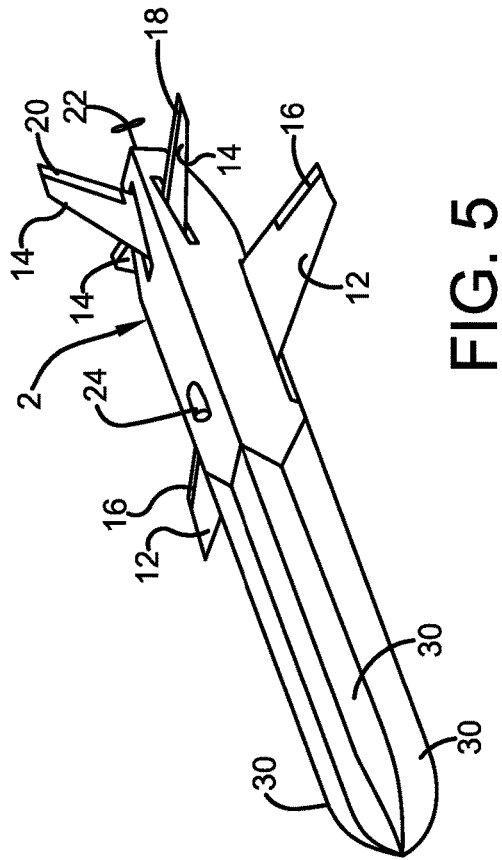
FIG. 4 is a perspective view of another exemplary airframe with wings and tail retracted and its net arms in their closed condition.
Figure 5:
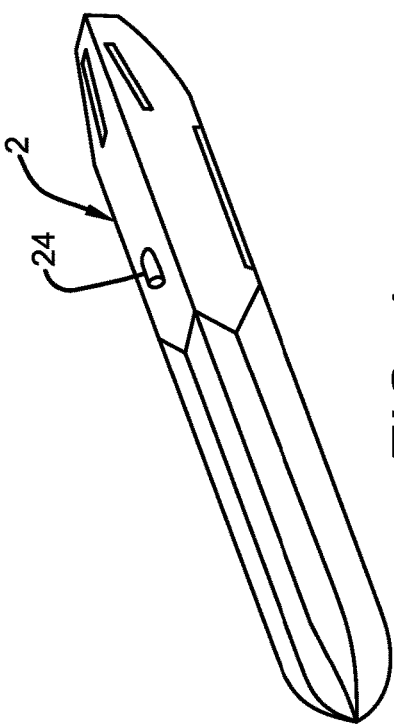
FIG. 5 is a view of the airframe of FIG. 4 with the wings and tail extended and its net arms in their closed condition.
Figure 6:
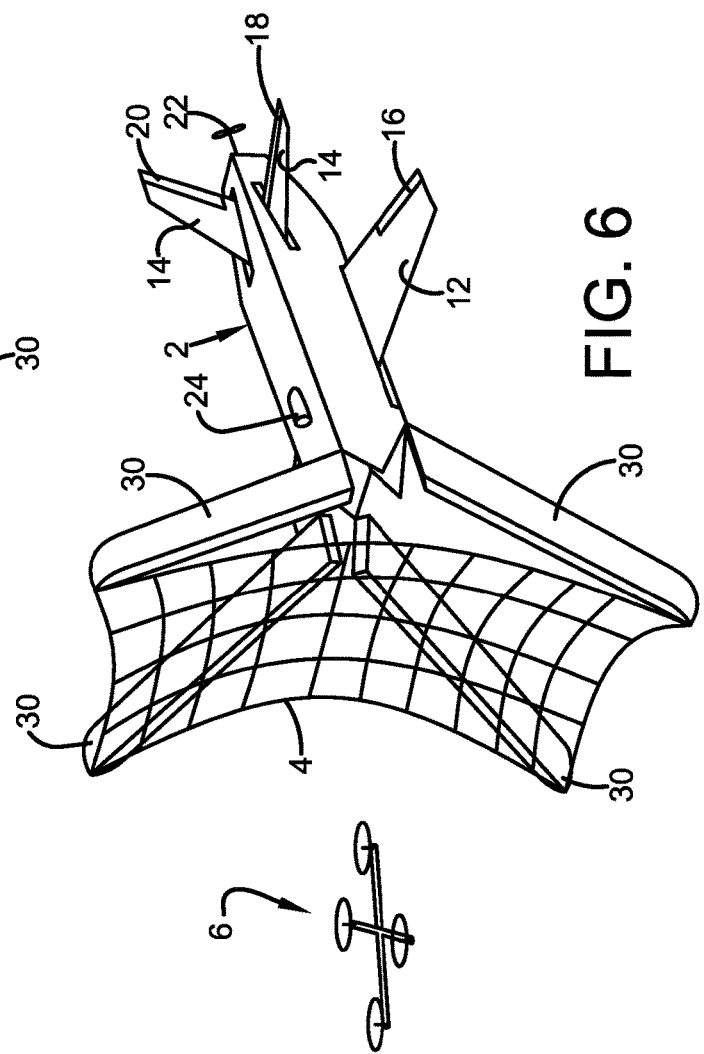
FIG. 6 is a view of the airframe of FIG. 4 with the net arms deployed to their open conditions to open the net in front of the airframe.
Figure 7:
FIG. 7 is a perspective view of another exemplary airframe in the form of a multiple rotor UAV with four arms in their closed conditions.
Figure 8:
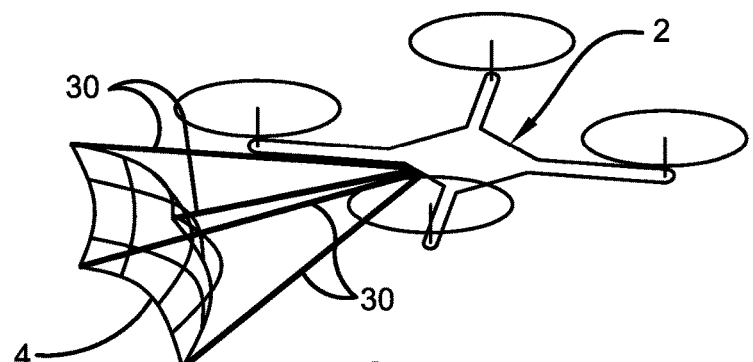
FIG. 8 is a perspective view of the airframe of FIG. 7 with the arms deployed to their open position to open the net.

FIGS. 1-3 depict a first exemplary configuration of an airframe 2 having a deployable net 4 that is used to disable or capture a target vehicle 6. FIGS. 4-6 depict a second exemplary configuration of airframe 2. FIGS. 7-8 depict a third exemplary configuration of airframe 2. In general, each airframe 2 includes a body or fuselage configured to allow airframe 2 to be flown and controlled in the air. Different airframes can be used including manned aircraft or unmanned aircraft, fixed wing, rotorcraft, ducted-fan, ornithopter or orthopter, rocket/missile, and/or lighter-than-air. In the configurations of FIGS. 1-8, airframe 2 is able to carry and selectively deploy a net 4 having a span of two to ten feet although the size or net 4 is dependent on the size and power of airframe 2. Airframe 2 can be flown while net 4 is deployed. In the winged configurations, the airframe is configured to fly in a forward direction and these airframes 2 are configured to deploy net 4 at a forward portion of the airframe body or at the front of the airframe body. In the multiple rotor configuration, the body is configured to deploy the net outwardly of the rotors so that a target will engage the net prior to contact with the rotors.

In the exemplary configurations of FIGS. 1-6, airframe 2 includes retractable wings 12 and three retractable stabilizers 14. The retractability is an option that provides for alternate launching configurations. The retractable elements allow airframe 2 to be stored and transported easily and allow airframe to be launched from a launch tube with the wings and stabilizers being deployed immediately after launch. Each wing 12 includes a movable flap 16 and each stabilizer 14 includes an elevator 18 or rudder 20 that allow airframe 2 to be controlled by an operator. One or more pusher or puller propellers 22 can be used or one or more jet engines can be used to move the airframe.

Airframe 2 carries a power source such as batteries/fuel, an engine or engines for the propeller or rotors, and communications equipment to allow airframe 2 to be operated remotely. A sensor, a plurality of sensors, a camera 24, or a combination of sensors and a camera are provided to assist the operator in remotely piloting airframe 2. The communications equipment allows the operator to pilot airframe 2 through a controller such as a radio frequency controller or a mobile computer such as a smart phone using cellular, WIFI, ZigBee®, Bluetooth®, WiMAX, communications protocols or a combination of both. Autopilot systems may be included to allow the airframe to fly patrolling routes while using sensors to look for target aircraft. The software necessary to connect a ground control computer to the UAV is dependent on the autopilot system. In example, a Pix-Hawk Autopilot uses PX4 software. DJI Autopilots use DJI Software. The autopilot software can launch, pilot, and return the UAV autonomously. Airframe 2 can be a type vehicles having a range of less than 10 kilometers. Airframe 2 also can be the type that must be in line of sight with the user for operation. Non-limiting exemplary UAVs operable with arms 30 and net 4 include larger group 1 & 2 UAVs: Rotorcraft=Theiss Validus Hex, Theiss Validus Y6, DJI 600, DJI 1000, Fixed Wing=Theiss Primus Air. Net 4 can be deployed manually or automatically.

For each exemplary configurations of FIGS. 1-6, airframe 2 includes at least a single deployable arm 30 that selectively moves from a closed condition (FIGS. 2 and 5) to an open condition (FIGS. 3 and 6). For the exemplary configuration of FIGS. 7-8, at least two deployable arms 30 are used. Arms 30 are rigid and hold net 4 out in front of the major portions of arms 30. As such, net 4 is deployed in front of the hinged connections between arms 30 and the body of airframe 2. Arms 30 can be metal, plastic, carbon-fiber, wood, or other rigid material. In each configuration, net 4 is either connected between arm 30 and a portion of airframe 2 or portions of different arms 30 so that net 4 is spread open when arm or arms 30 are moved to their open conditions. Net 4 is configured to capture or disable a target airframe 6 such as a multi-rotor UAV. The operator flies airframe 2 until in the general area of the target vehicle. Net 4 is deployed by moving arm(s) 30 to the open condition. Net 4 is not launched from airframe 2 at target aircraft 6. Rather, arms 30 are deployed to open net 4 and airframe 2 is flown into or just above target aircraft 6 causing target aircraft 6 to be engaged by open net 4. Net 4 tangles and disables the propeller or rotors of the target vehicle which renders it unable to fly. In another configuration, a sensor such as a proximity sensor can be used to automatically deploy net 4 based on closing speed and distance of airframe 2 from target vehicle 6.

Once the target vehicle is captured in net 4, airframe 2 can release net 4 by openings net latches on arms 30, release the net 4 and arms 30 as a combination, continue to fly with the captured target, or cease operations and drop to the ground. In each of these options, a parachute 31 can be used to control the decent of the item(s) being returned to the ground via gravity.

In the first configuration of FIGS. 1-3, two arms 30 deploy downwardly and laterally outwardly from a closed condition at the bottom front of the body of airframe 2 that is rearward of the front of the body. The connection between arms 30 and the body is forward of the rear of the body and is hinged. When moved to their open conditions, the two arms 30 hold the bottom corners of net 4 below and laterally outwardly of the airframe body with the other corner of net 4 being connected to the airframe. Arms 30 are rigid to hold the open condition of the net. When arms 30 are deployed to their open conditions, the connections between the arms 30 and the body of the airframe are behind the net 4. This allows net 4 to engage the target before the main portions of the arms 30. In some situations, the tips of arms 30 can engage the target just before net 4. In this configuration, the front of the airframe is disposed in front of the forward tips of arms 30 as they have moved back through the pivoting motion. In the exemplary configuration, net 4 is triangular and held open by two arms 30 and the body of airframe 2. These two arms 30 can also deploy up from the top of the airframe body, from one or both sides of the airframe body, or a combination of the options. In other configurations, net 4 can be connected at two locations on the body of airframe 2 and to two arms 30 to provide a net 4 with a different shape. An option for the two arm system of FIG. 2 is providing hinged arms that pivot rearwardly after the target vehicle is captured to allow airframe 2 to be flown with better control after the target is captured. In this configuration, the connection between the net and the airframe body is released and arms 30 and net 4 swing rearwardly together.

In the second configuration of FIGS. 4-6, a plurality of arms 30 at the front of airframe 2 move to the open configuration to spread net 4 between arms 30. Arms 30 can define the front of airframe 2 when closed with net 4 stored between the closed arms 30. The exemplary configurations depict four arms 30 but other numbers of arms can be used. In the configuration of FIGS. 7-8, a plurality of arms 30 extends from a side, front, or rear of a multiple rotor airframe. In both configurations, arms 30 can be moved from a closed condition to an open condition to hold a net 4 in an open configuration where it can engage a target. Arms 30 are rigid to hold the open net out in front of the body of airframe 2. The hinged connections between arms 30 and the body of the aircraft are disposed rearwardly of the open net. In these configurations, the top arms moves up and outwardly and each of the bottom arms moves down and outwardly to spread net 4 to an open configuration. As shown in FIGS. 5 and 6, the front portions of the arms define the front of the airframe when the arms are both closed and open. This vehicle can use a pusher propeller 22 or propellers disposed on the wings 12.

In these configurations, arms 30 can be openable in a one-way configuration or can be openable and closable in a two-way arrangement. Arms 30 can be opened and closed in a variety of ways with examples depicted schematically in FIGS. 11-24. In each of these configurations, arms 30 can be connected to the body of the airframe with hinges that facilitate the pivoting movement between the conditions. In the configuration of FIGS. 11 and 12, arm 30 is pushed open by the force of the wind 32 that engages a baffle 34 disposed on the outside of the arm. The force is sufficient to push arm 30 from its closed condition of FIG. 11 to its open configuration of FIG. 12 when a stop 36 is removed. In this configuration, stop 36 is disposed rearwardly of hinge 38 to engage the rear end of arms 30. Arm 30 can be moved back from the open condition to the closed condition by pivoting stop 36 back from its position in FIG. 12 to the position of FIG. 11. FIGS. 13-18 depict configurations using resilient members 40 to push arms 30 open when a holding force 42 (such as from a latch) is removed or resilient members 44 to pull open arms 30. Resilient members 40 and 44 can be springs such as coil or torsion springs or can be rubber or polymer resilient bands or blocks. In these configurations, resilient members 40 and 44 engage arms 30 closer to the rear portion of arms 30 near hinge 38. FIGS. 19-24 depict configurations using actuators 46 to push arms 30 open when a holding force 42 (such as from a latch) is removed or actuators 48 to pull open arms 30. Actuators 46 and 48 can be pneumatic, hydraulic, or mechanical and can be one-way or two-way. Piston-cylinders, power screws, servo motors can be used as exemplary actuators. As above, actuators 46 and 48 engage arms 30 closer to the rear portion of arms 30 near hinge 38.

In each of the configurations above, net 4 can be connected to retraction device disposed in the airframe which, when activated, retracts nets 4. The retraction device can be a winch that has a cord connected to the net and pulls the net back inside the airframe when the cord is wound up. When retracted, net 4 pulls arms 30 back to their closed conditions.

Figure 9:
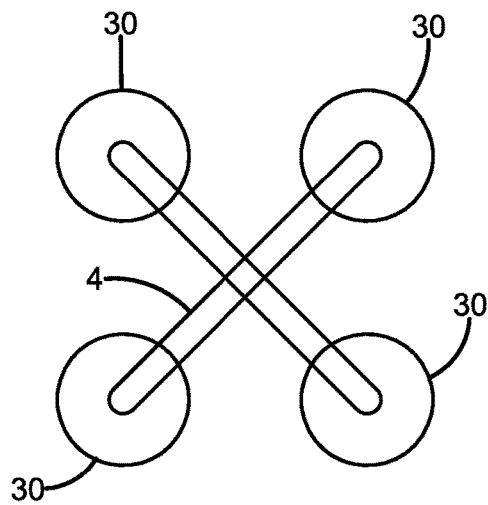
FIG. 9 depicts an alternate net configuration in the form of a pair of cross wires carried by the arms.
Figure 10:
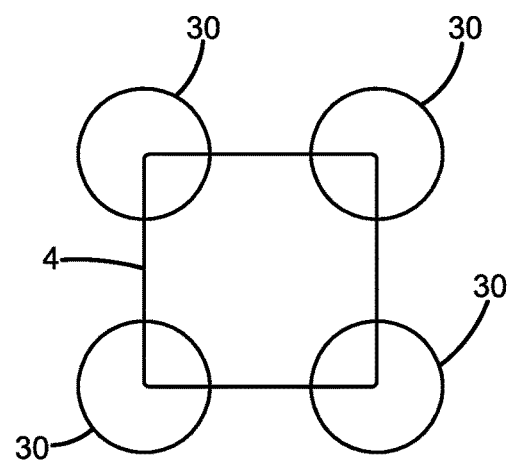
FIG. 10 depicts an alternate net configuration in the form of a frame of wires carried by the arms.

Net 4 can be in the form of a traditional net that readily becomes entangled in the rotors of a multi-rotor drone. This traditional net is depicted in FIGS. 3, 6, and 8 and includes a plurality of intersecting, joined thin members. Exemplary thin members for net 4 include be non-metal cords, polymer fibers, metal wires, or a combination of materials. The members can be tied or twisted at each intersection to hold the overall shape of net 4. The assembly can be connected at its corners to arms 30. Net 4 also can be structures connected to arms 30 that are used to disable target vehicle 6. For example, in the FIG. 9 configuration, thin members can be disposed between the arm ends. These thin members can be non-metal cords, polymer fibers, or metal wires that are strong enough to disable or break the rotors on target vehicle 6. These can be disposed in an "X" shape (FIG. 9) or a frame such as the rectangle of FIG. 10. A combination both configurations can be used.

Figure 25:
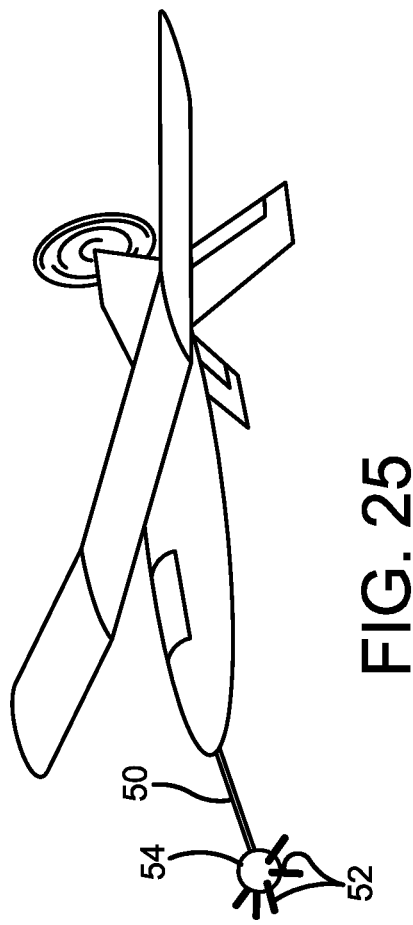
FIG. 25 is a perspective view of an airframe with a first configuration of a fixed arm used to intercept another vehicle.
Figure 26:
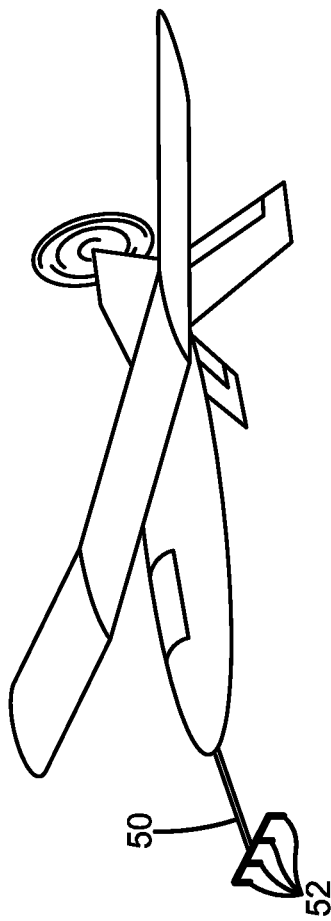
FIG. 26 is a perspective view of an airframe with a second configuration of a fixed arm used to intercept another vehicle.
Figure 27:
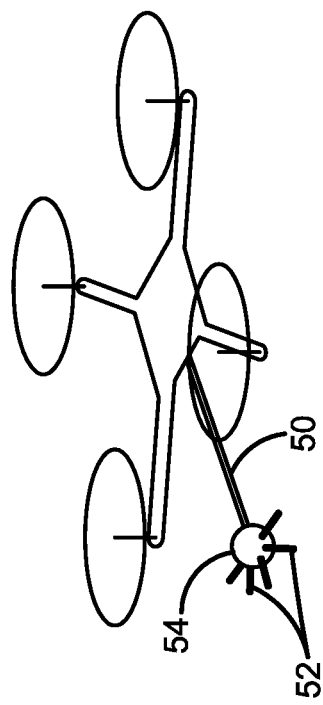
FIG. 27 is a perspective view of the first configuration of the fixed arm used with a multiple rotor vehicle.
Figure 28:
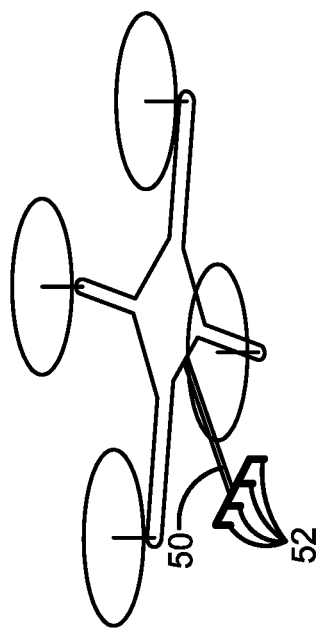
FIG. 28 is a perspective view of the second configuration of the fixed arm used with a multiple rotor vehicle.

FIGS. 25-28 depict aerial vehicle (fixed wing in FIGS. 25-26 and multiple rotor in FIGS. 27-28) configurations combined with a fixed arm 50 intercept device that can be used to disable another airborne vehicle. The first configuration of arm 50 is shown in FIGS. 25 and 27 with a plurality of rigid fingers 52 extending from a central body 54. Central body 54 is solid and made from a dense material to give it weight. The combination of rigid fingers 52 and the heavy central body provides a configuration useful for destroying rotors or propellers on other aerial vehicles. The second arm configuration of FIGS. 26 and 28 has rigid fingers arranged perpendicular to a common cross arm like a garden rake. Arms 50 project from the front of a fixed wing aerial vehicle (FIGS. 25-26) so that they can be rammed into another vehicle. In the configurations of FIGS. 27-28, arm 50 is long enough to extend outwardly of the rotors of the vehicle to ensure that arm 50 engages another vehicle before the rotors.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. An airframe used to intercept another aerial vehicle in the air while flying; the airframe comprising:
    a body having an arm hinged to the body and movable between closed and open conditions;
    a net connected to the arm and the body; the net being open when the arm is in the open condition; and
    the net being disposed in front of the hinged connection between the arm and the body when the arm is in the open condition.

2. The airframe of claim 1, wherein the net is releasable from the body and arm.

3. The airframe of claim 2, further comprising a parachute connected to the net.

4. The airframe of claim 3, wherein the parachute is carried by the body.

5. An airframe used to intercept another aerial vehicle in the air while flying; the airframe comprising:
    a body having a plurality of arms projecting forward in a flight direction from the body; and
    a net carried by the arms.

6. The airframe of claim 5, wherein the arms are movable between a closed condition and an open condition with respect to the body.

7. The airframe of claim 6, wherein each of the arms pivots between the closed condition and the open condition on a hinge.

8. The airframe of claim 7, wherein the net is disposed forward of the hinges when the arms are in the open condition.

9. The airframe of claim 6, wherein each of the arms includes a baffle that allows the arm to be moved from the closed condition to the open condition by wind force.

10. The airframe of claim 6, further comprising a resilient member that moves at least one of the arms from the closed condition to the open condition.

11. The airframe of claim 6, further comprising an actuator that moves at least one of the arms from the closed condition to the open condition.

12. The airframe of claim 5, wherein the net is releasable from the body.

13. The airframe of claim 12, wherein the net is releasable from the arms.

14. The airframe of claim 13, further comprising a parachute connected to the net.

15. The airframe of claim 12, wherein the arms are releasable from the body with the net.

16. The airframe of claim 15, further comprising a parachute connected to the net.

17. The airframe of claim 5, wherein the net is carried by the arms in front of the body.

* * * * *